United States Patent
Tansey et al.

(10) Patent No.: US 7,895,300 B1
(45) Date of Patent: Feb. 22, 2011

(54) SYSTEMS AND METHODS FOR TESTING DEVICE PORTS IN A STORAGE AREA NETWORK

(75) Inventors: Patrick J. Tansey, Maple Grove, MN (US); Carol A. Gaupp, Coon Rapids, MN (US); Bret E. Indrelee, Edina, MN (US); Tru Dam, Maplewood, MN (US); Craig R. Stubbins, Eden Prarie, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 505 days.

(21) Appl. No.: 12/039,604

(22) Filed: Feb. 28, 2008

(51) Int. Cl.
*G06F 13/00* (2006.01)
(52) U.S. Cl. ...................... 709/220; 702/120
(58) Field of Classification Search ................ 709/220; 702/117, 120, 122
See application file for complete search history.

(56) References Cited

U.S. PATENT DOCUMENTS

| | | | |
|---|---|---|---|
| 7,342,897 B1* | 3/2008 | Nader et al. | 370/255 |
| 2004/0015616 A1* | 1/2004 | Chen | 710/1 |
| 2007/0255990 A1* | 11/2007 | Burke et al. | 714/731 |

* cited by examiner

*Primary Examiner*—Robert B Harrell
(74) *Attorney, Agent, or Firm*—Klein, O'Neil & Singh, LLP

(57) ABSTRACT

Method and system for configuring a switch element having a plurality of ports to operate as a test tool is provided. The method includes initiating a user interface with a plurality of selectable options, where a user selects one or more of the selectable options for configuring test parameters for a port to operate as a test port; obtaining a license key for configuring the port to operate as the test port; selecting a port from among the plurality of ports to operate as the test port; selecting a frame type for transmitting frames from the test port; specifying characteristics for the frames transmitted by the test port; determining whether the test port is online or offline; enabling a transmitter of the test port; starting a link state machine of the test port; the test port receiving an active signal or an active primitive to thereby activate the test port; the test port logging into the network; and the test port logging into a target device of the network.

20 Claims, 4 Drawing Sheets

SYSTEMS AND METHODS FOR TESTING DEVICE PORTS IN A STORAGE AREA NETWORK

TECHNICAL FIELD

The present disclosure relates to storage area networks (SANs) and to methods for using a switch element to operate as a test tool.

DESCRIPTION OF RELATED ART

Storage area networks ("SANs") are commonly used where plural memory storage devices are made available to various host computing systems. Data in a SAN is typically moved from plural host systems (that include computer systems, servers etc.) to the storage system through various controllers/adapters.

Typically, a SAN includes various devices to facilitate communication between host systems and storage devices. For example, Fabric switches, host bus adapters and others. As SANs continue to grow, efficient SAN configuration and testing is desirable. Continuous efforts are being made to improve SAN device testing.

SUMMARY

In one embodiment, a method for configuring a switch element having a plurality of ports to operate as a test tool is provided. The method includes initiating a user interface with a plurality of selectable options, where a user selects one or more of the selectable options for configuring test parameters for a port to operate as a test port; obtaining a license key for configuring the port to operate as the test port; selecting a port from among the plurality of ports to operate as the test port; selecting a frame type for transmitting frames from the test port; specifying characteristics for the frames transmitted by the test port; determining whether the test port is online or offline; enabling a transmitter of the test port; starting a link state machine of the test port; the test port receiving an active signal or an active primitive to thereby activate the test port; the test port logging into a network; and the test port logging into a target device of the network.

In another embodiment, a system for testing storage area network device configuration is provided. The system includes a plurality of ports coupled to a switch element with a plurality of ports; and a computing system executing a user interface, the user interface providing a plurality of selectable options to a user to configure one or more ports of the switch element to operate as a test port; wherein the user (a) selects one or more of the selectable options for configuring test parameters for a port to operate as test port; (b) obtains a license key for configuring a port to operate as the test port; (c) selects the port from among the plurality of ports to operate as the test port; (d) selects a frame type for transmitting frames from the test port; (e) specifies characteristics for the frames transmitted by the test port; (f) enabling a transmitter of the test port; (g) starts a link state machine of the test port; and the test port logs into a target device of a network.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the invention. The drawings include the following Figures.

DETAILED DESCRIPTION

Figure 1:
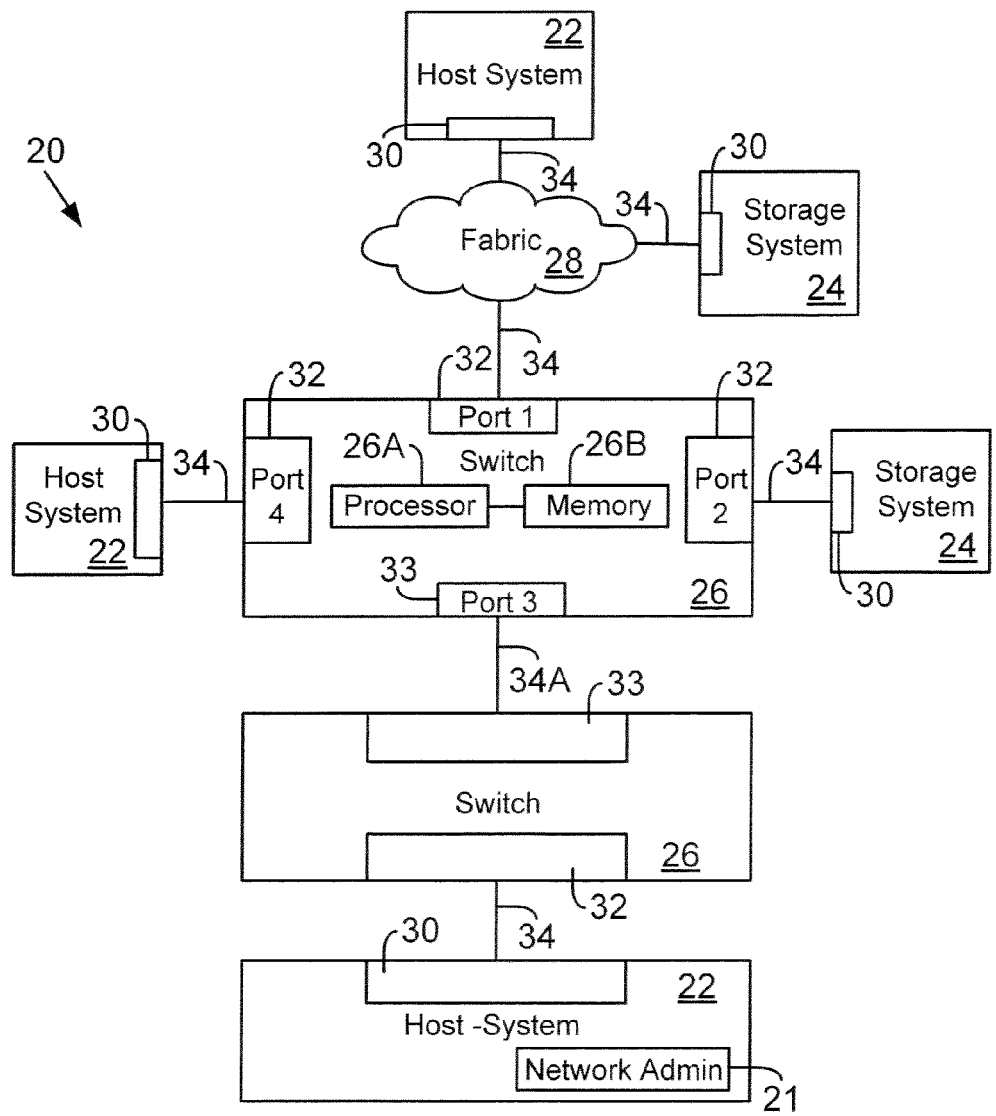
FIG. 1 is a schematic block diagram of a network system.

The following definitions are provided as they are typically (but not exclusively) used in the Fibre Channel environment, implementing the various adaptive aspects of the present embodiments.

E_Port: An expansion port that is used to connect two Fibre Channel switch ports. When E_ports between two switches form a link, that link is referred to as an inter-switch link (ISL).

F_Port: A port to which non-loop N_Ports are attached in a fabric; and does not include FL_ports.

Fabric: The structure or organization of a group of switches, target and host devices (NL_Port. N_ports etc.) used in a SAN. In Fibre Channel, in a switched Fabric topology (defined by the FC-SW standard), devices are connected to each other through one or more Fibre Channel switches.

Fibre Channel ANSI Standard: The standard, incorporated herein by reference in its entirety, describes the physical interface, transmission and signaling protocol of a high performance serial link for support of other high level protocols associated with IPI, SCSI, IP, ATM and others.

N_Port: A direct fabric attached port.

Switch: A fabric element conforming to the Fibre Channel Switch standards.

Embodiments of the present system and methods allow a user to configure a switch element (for example, a Fibre Channel switch element) to operate as a testing tool. The testing tool generates network traffic to test fabric configuration and devices. Cost of using the test tool is advantageously less than the cost of a dedicated tester port or testing device that is typically used in conventional systems.

To facilitate an understanding of the various embodiments, the general architecture and operation of a SAN system will be described. The specific architecture and operation of the various embodiments will then be described with reference to the general architecture of the SAN.

Various standards and protocols may be used to enable communication between storage systems and host systems. For example, Fibre Channel, InfiniBand, Fibre Channel over Ethernet (FCOE) and others. The examples below are described with respect to the Fibre Channel standard, but the adaptive embodiments may be used in any other protocol or system.

Fibre Channel is a set of American National Standard Institute (ANSI) standards, which provide a serial transmission protocol for storage and network protocols such as HIPPI, SCSI, IP, ATM and others. Fibre Channel supports three different topologies: point-to-point, arbitrated loop and Fibre Channel fabric. The point-to-point topology attaches two devices directly. The arbitrated loop topology attaches devices in a loop.

The Fibre Channel fabric topology attaches host systems directly to a fabric, which are then connected to multiple devices. The Fibre Channel fabric topology allows several media types to be interconnected. Fibre Channel fabric devices include a node port or N_Port that manages fabric connections. The N_port establishes a connection to a fabric element (e.g., a switch) having a fabric port or F_port. Fabric elements include the intelligence to handle routing, error detection, recovery, and similar management functions.

A Fibre Channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port Fibre Channel switch. Fibre Channel switches use memory buffers to hold frames received and sent across a network.

FIG. 1 shows a schematic block diagram of a Fibre Channel network system 20 configured for implementing the methods and systems in accordance with the various embodiments disclosed herein. System 20 includes a plurality of interconnected devices. For example, system 20 includes a plurality of computing systems (also referred to as host systems) 22 and storage systems 24. Switches 26 connect devices to one another and to fabric 28.

Host systems (22) typically include several functional components. These components may include a central processing unit (CPU) 26A, main memory 26B, input/output ("I/O") devices, and streaming storage devices (for example, tape drives). The main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems 22 often communicate with storage systems via a host bus adapter ("HBA", may also be referred to as a "controller" and/or "adapter") 30 (also referred to as an N_Port below) using an interface, for example, the "PCI" bus interface, PCI-X, PCI-Express or any other standard or proprietary interface. PCI stands for Peripheral Component Interconnect, a local bus standard that was developed by Intel Corporation®. The PCI/PCI-X and PCI-Express standards are incorporated herein by reference in its entirety. HBA 30 are provided by QLogic Corporation, the assignee of the present application.

Each device in system 20 includes one or more ports, classified as, for example, node ports (N_Ports) 30, fabric ports (F_Ports) 32, and expansion ports (E_Ports) 33. Node ports 30 may be located in node devices, such as the host systems 22 (i.e. in a HBA) and the storage systems 24. Fabric ports are located in fabric devices such as the switches 26.

The devices of FIG. 1 are operationally coupled via links or paths 34 (or 34A between E_Ports). A path 34 may be established between two N_ports 30, and/or between an N_port 30 and an F_Port 32. A packet-switched path may be established using multiple links. For example, an N_Port 30 in one of the host systems 22 may establish a path with one of the storage systems 24 through one of the switches 26.

One or more network administrators 21 may be executed by host system 22 using one or more input devices, such as a keyboard (not shown) or a pointing device (not shown). Network administrator 21 may execute a software application, for example, a management application that allows the network administrator to configure and test system 20 devices/ports. An example of one such management application is the QLogic® Enterprise Management Suite or the QLogic SanSurfer provided by QLogic Corporation, the assignee of the present application.

In conventional systems, specialized Tester devices (or ports) are commonly connected to a fabric to generate test traffic for testing fabric configuration. Tester ports, however, are expensive. The adaptive embodiments described below provide a comprehensive solution that allows one to use an exiting switch port to operate as a tester port.

Figure 2A:
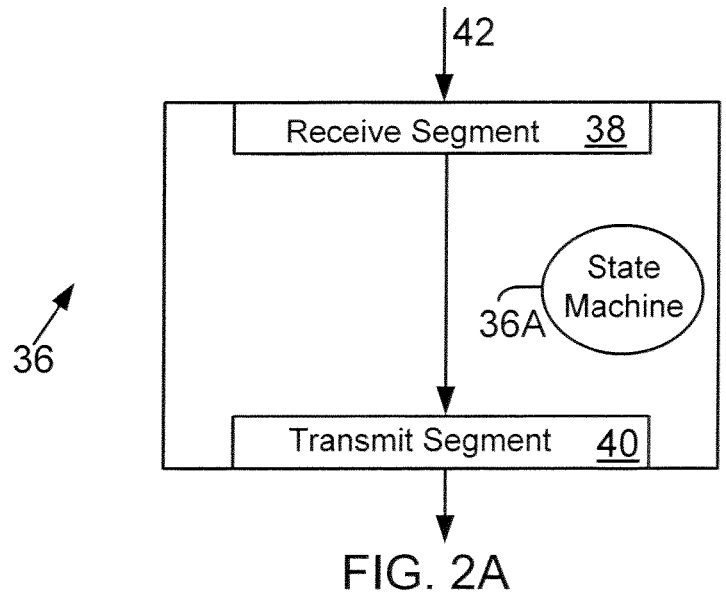
FIG. 2A is a schematic block diagram of a port in a Fibre Channel device.

FIG. 2A illustrates, schematically, a device port 36. The port 36 includes a receive segment 38 and a transmit segment 40. Data packets or frames 42 are received at the receive segment 38 and transmitted through the transmit segment 40. A link state machine 36A may be used at a port level to configure and operate port 36 as a test tool, described in detail below. In one embodiment, state machine 36A is implemented in firmware code (50) (FIG. 2B).

Figure 2B:
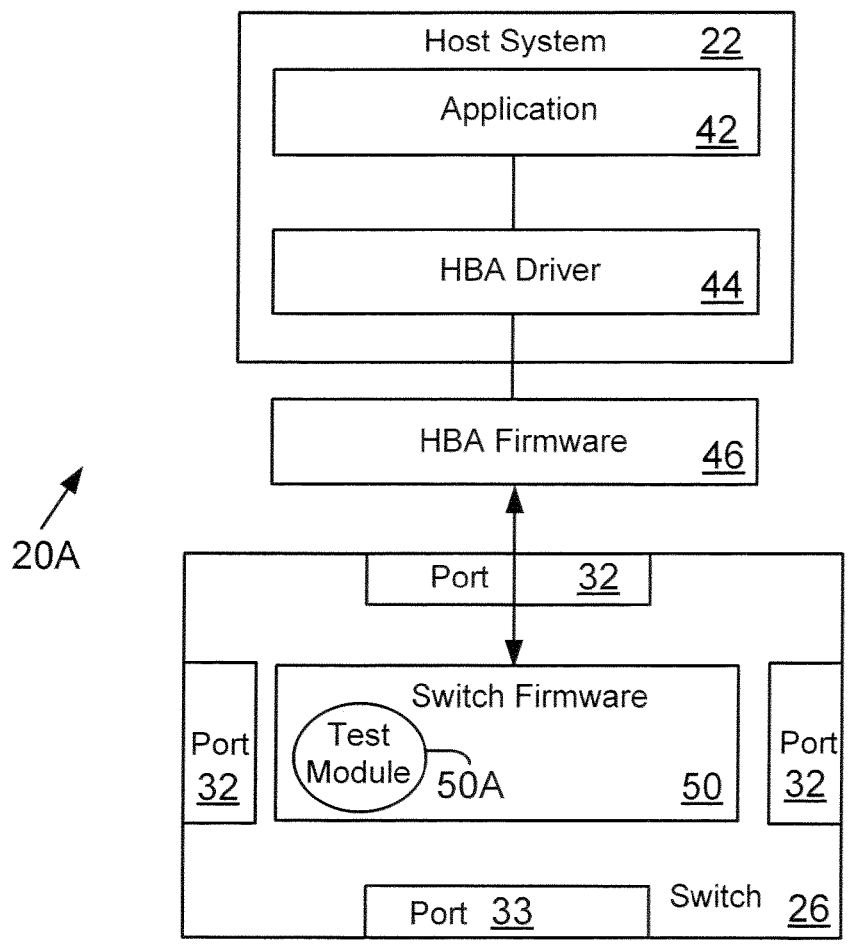
FIG. 2B shows an example of a software architecture used according to one embodiment.

FIG. 2B shows an example software architecture 20A that may be used to enable communication between various ports/devices within system 20. In one embodiment, an application 42 executed by host system 22 interfaces with a HBA driver 44 and HBA firmware 46 to communicate with switch 26. HBA firmware 46 is executable code in a HBA to control overall HBA operations. Switch firmware 50 is executed by switch processor 26A out memory 26B. Switch firmware 50 includes a test module 50A that provides a user with an option to configure a port (32 or 33) to operate as a test port, as described below. A port when configured to operate as a test port may also be referred to as a "QT port".

Figure 2C:
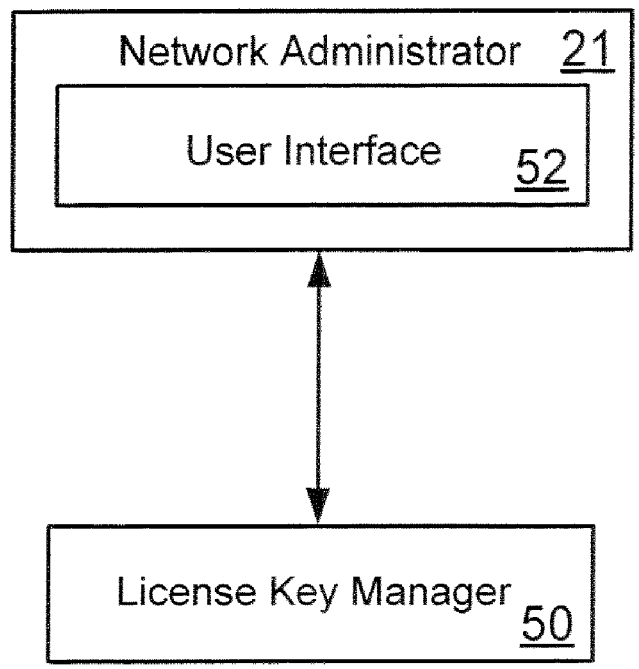
FIG. 2C shows a block diagram of an architecture with a user interface, according to one embodiment.

In one embodiment, test module 50A interfaces with a user interface (52, FIG. 2C) that allows a user to configure a switch 26 port to operate as a test port. A user may have to obtain a license key (i.e. permission) from a switch provider (for example, QLogic Corporation) before a test port may be configured to operate as a test tool. FIG. 2C shows an example of a user interface 52 executed and controlled by a network administrator 21. User interface 52 communicates with a license key manager 50 to obtain the appropriate permissions to configure and operate a switch port as a test port. A switch provider or any other party may maintain license key manager 50 in a secured database (not shown). License key manager 50 may include user information, including, whether a user has permission to configure a switch port to operate as a test port.

Once a user obtains the appropriate permissions, the user using user interface 52 may configure a standard port to operate in a test mode as a test port. In one example, the user creates an object, referred to as "QT port object", which functionally adds a new port type for an existing standard port. The QT port type enables the user to operate the switch element port as a test port.

In one embodiment, the user interface 52 may provide a menu of selectable options (also referred to as a "testbed menu") to a user to configure a port to operate as a test port. The following provides an example of some of the options/commands (used interchangeably):

(1) Display Test Log: This command displays a test log for a specific QT port object, which is stored in a temporary directory. A separate test log file may be maintained for each test port.

(2) Display Current Settings: This option displays a current configuration for a testbed menu for a specific test port (QT Port). The following shows an example of current port setting for a test port. The term "QT State" means the state for a test port, when the port is being used as test tool. QT_STATE_XMITTER_ENABLED means the port transmitter segment as a test tool has been enabled.

| QT State | QT_STATE_XMITTER_ENABLED |
|---|---|
| Destination Target | Unknown |
| Frame Type | Repeat |
| Start of Frame | SOFi3 |
| Replace Addresses | True |
| Pattern | FF00FF00 |
| Frame Length (32 bit words) | 528 |
| NPIV Request Count | 1 |
| Start Link State Machine Set | False |
| Fabric Login Set | False |
| Start Traffic Set | False |
| OX_ID Assignment Strategy | Fixed |

3) Start Link State Machine: This command starts a link state machine (for example, 36A) of a test port. If a user turns off the link state machine, the test port disreagrds link primitives received from a link. Once the state machine is enabled, it will continue to run until a switch is reset or the user turns off the link state machine.

(4) Start Traffic: This option allows a QT port object to generate traffic for a destination target/port.

(5) Log into Fabric: This command enables a QT port to send FLOGI commands to a fabric switch after a link state machine reaches the "ACTIVE" level. When a response to the FLOGI request is received, the QT port is logged in to the fabric and its port state is updated to as "Online".

(6) Set Frame Type: This command allows a user to specify the type of frame sent from a test port. The default frame type may be a class 3 initiator frame (SOFi3). The user may also be presented with a list of all valid start of frames (SOFs) to choose from. For example:

| | | |
|---|---|---|
| 1) | SOFc1 | Connect Class 1 |
| 2) | SOFi1 | Initiate Class 1 |
| 3) | SOFn1 | Normal Class 1 |
| 4) | SOFi2 | Initiate Class 2 |
| 5) | SOFn2 | Normal Class 2 |
| 6) | SOFi3 | Initiate Class 3 |
| 7) | SOFn3 | Normal Class 3 |
| 8) | SOFf | Fabric |
| 9) | SOFc4 | Connect Class 4 |
| 10) | SOFi4 | Initiate Class 4 |
| 11) | SOFn4 | Normal Class 4 |

Once the user selects the frame type, the user is prompted to select a frame type pattern. For example, a "Repeated data frame pattern". For the repeated data frame pattern, the user specifies a repeated 32 bit data pattern to fill up the frame up to a user specified frame length. The repeated data value may be specified with or without a leading 0x.

A user may also be permitted to create a file with contents specifying a layout for a frame header and payload. For example:

```
00010600    RCt1 = FC4Uncat; D_Id = 0x010600;
00010500    CS_CTL = 0x00; S_Id = 0x010500;
00280000    Type = 0x00; RX/OX = OX; S_C = S_C_I; F_S; E_S;
00000000    SEQ_Id = 0x00: DF_Ctl = No Opt Header;
            SEQ_Cnt = 0x0000;
80000000    OX_Id = 0x8000; RX_Id = 0x0000;
00000000    PARA = 0x00000000;
BED72347    Pld 0001 3 word RPAT pattern
6B8FB314    Pld 0002 repeated 16 times
5EFB3559    Pld 0003
BED72347    Pld 0004
```

The first 6 lines represent a frame header, all lines after that represent payload words. The user may add comments anywherein the file.

Next the user may be presented with a list of frames found on a switch that are potentially frame files. Once the user specifies a file name, the user is presented a screen with a specified frame header. The user may modify any field of the frame header.

Set Frame Length: This command allows a user to set a frame length for frames that are generated via a repeated test pattern.

(7) Send NPIV Request: NPIV is a virtual port identifier value for a switch element port. The NPIV allows a port to be shared by plural systems. The NPIV can be used to represent the same port with a different identifier. The "SEND NPIV Request" command uses a parameter representing, a number of NPIV requests to send. The switch may then send a FDISC command with a S_ID (source identifier) of 0 with a unique port WWN (world wide port number) for each corresponding NPIV request to a fabric switch.

(8) Select Port(s): The command allows the user to change which port(s) it is operating on. Selecting this menu option will change the QT port number(s) on which all successive commands are targeted.

(9) Clear Test Log: This command clears a test log file for QT port(s).

(10) Reset to Defaults: This command sets the testbed menu parameters back to the default settings on specified QT ports.

(11) Stop Link State Machine: This command stop a link state machine on a QT port so that it will disregard link primitives from a device attached to the QT port. This will also cause the QT port to log out from the fabric if it was logged in.

(12) Stop Traffic: This command stops the traffic from being generated at a QT port.

(13) Log out of Fabric: This command logs out a QT port that is logged onto a fabric.

(14) Send Frame Immediate: This command may be used to send a single frame immediately based on what was specified by a user specified file frame type, described above. The frame is sent as configured in the frame file, without S_ID (standard Fibre Channel source identifier field in a Fibre Channel frame header)/D_ID (standard Fibre Channel destination identifier, included in a Fibre Channel frame header) replacement. The frame is sent regardless of the port state.

Figure 2D:
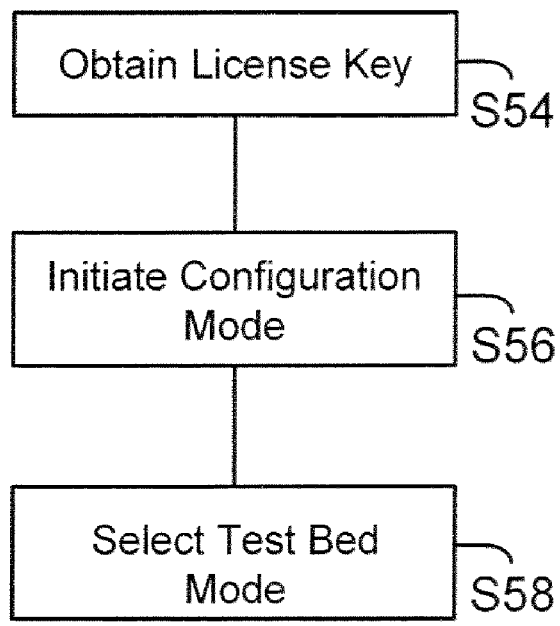
FIG. 2D shows a process flow diagram for obtaining a license to configure a switch element port to operate as a test port.

FIG. 2D shows a process flow diagram of a method for configuring a switch element port to operate as a test port via user interface 52. The process starts in step S54, when a user using user interface 52 obtains the appropriate permissions for configuring a port to operate as a test tool. In step S56, the user initiates a configuration mode for a switch port.

In step S58, the user selects a "test bed" mode option to configure a port. The test bed mode allows a user to configure a switch port to operate as a test port. The user interface 52 provides selectable options to select one or more configuration options. Examples of the various configuration options are provided above.

Figure 3:
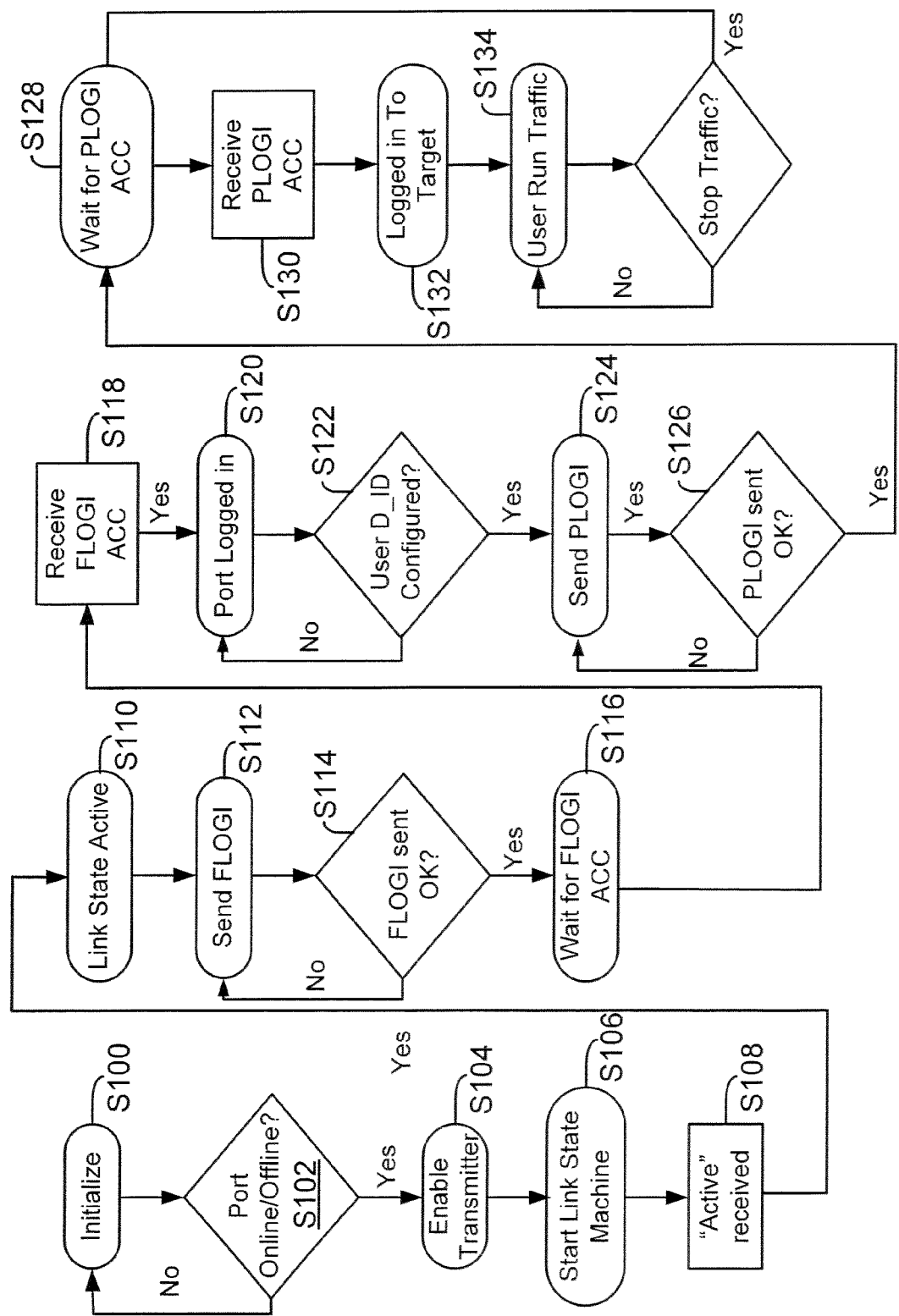
FIG. 3 is a flowchart illustrating one embodiment of the present methods for converting a Fibre Channel switch element into a test tool.

FIG. 3 illustrates a process flow of one embodiment of the present methods for using a Fibre Channel switch element as a test tool. The switch element (26) is connected to a Fibre Channel network system, such as the system 20 illustrated in FIG. 1 and described above. The switch element includes a plurality of communication ports, such as the port 36 (or 32 and 33) illustrated in FIG. 2A.

With reference to FIG. 3, in step S100 the Fibre Channel switch element is initialized. A network administrator (or user) identifies a port in the switch element that will operate as a test tool. For simplicity, this port will be referred to herein as the test port. The user may switch between different ports, designating each as a test port, at any point in the present methods.

In step S102 the network administrator checks whether the test port is online or offline. If the test port is offline, the process reverts to step S100. If the test port is online, the process proceeds to step S104. In step S104 the network administrator enables a transmitter of the test port, and in step S106 the network administrator starts a link state machine (LSM) (for example, 36A) of the test port.

In step S108 the test port receives an active signal or primitive from switch firmware (for example, 56, FIG. 2B), and in step S110 the LSM is active. In step S112 the network administrator sends a fabric login primitive (FLOGI) to the test port to begin the process of logging the test port into the Fibre Channel network system. In step S114, the FLOGI send process is verified. If the FLOGI was not sent properly, the process reverts to step S112. If the FLOGI was sent properly, the process proceeds to step S116. In step S116 the network administrator waits for acknowledgement (ACC) that the test port received the FLOGI primitive. In step S118, the network administrator receives the FLOGI acknowledgement (ACC). In certain embodiments the FLOGI ACC may comprise a LS_ACC frame. LS_ACC is a standard Link Services Accept Fibre Channel frame sent in response to a previously sent Link Services request. The Fibre Channel-Link Services (FC_LS) specification describes the LS+ACC frame and the description is incorporated herein by reference in its entirety.

In step S120, the test port is logged into the Fibre Channel network system and can be viewed through any user interface showing the test port state.

In step S122, the network administrator determines whether a destination identifier (target device or destination device) has been configured. If the destination identifier is not configured, then the process reverts to S120. If the target device has been configured the process proceeds to step S124. In step S124 the test port sends a port login primitive (PLOGI) to the target device to begin the process of logging the test port into the target device. In step S126 the PLOGI send process is verified. If the PLOGI was not sent properly, the process reverts to step S124. If the PLOGI was sent properly, the process proceeds to step S128. In step S128, the network administrator waits for acknowledgement that the target device received the PLOGI primitive. In step S130 the network administrator receives the PLOGI acknowledgement (ACC) and in step S132 the test port is logged into the target device.

In step S134, the network administrator generates traffic in the network between the test port and the target device. The traffic generated in step S134 may comprise data frames. Embodiments of the present method may be configured to specify characteristics for the traffic and/or for the frames. For example, characteristics that might be specified include frame data patterns, frame lengths, frame counts, whether the frames are to be repeated forever in hardware, whether the frames are to be generated in software. FDISC counts, whether frames are to be sent from user defined files, and whether operationally acquired source identifier (S_ID)/destination identifier (D_ID) should replace user defined S_ID/D_ID within frame files. Embodiments of the present methods may also specify some predefined varieties of frames, such as CJTPAT and/or (CRTPAT) frames. CRTPAT and CJTPAT are standardized frame format patterns that are typically used to test Fibre Channel port connectivity. These frames are commonly used in "jitter" tests in transmitters.

In one embodiment of the present methods, in step S134 the test port may obtain addresses of a plurality of target devices from a fabric nameserver (NS) via a device type query. The test port may then start with the first device in the NS query response list by sending it a PLOGI. Upon receipt of the PLOGI LS_ACC, traffic is generated at the first target device for a preset interval, such as two seconds. After the interval expires the test port moves on to the next target device in the list from the NS query response. If there are no more devices, traffic may continue to the current target. If a different target device is found, a PLOGI will be sent to it, and traffic will be generated at that target device following receipt of a LS_ACC to the PLOGI.

With reference to FIG. 3, in step S136 a determination is made as to whether traffic should continue to be generated. If traffic is to continue, the process reverts to step S134. If traffic is to be halted, the process reverts to step S128. When traffic is halted, the present methods may include additional steps (not shown) of, for example, stopping the LSM, logging out of the Fibre Channel network, commanding the test port to stop traffic, and clearing a test log.

In certain embodiments of the present methods, a log file for each test port may be generated. The log file includes useful information about test run specifics. The log file may be stored, for example, in a temporary directory. The log file may allow a limited number of line entries, such one-thousand for example, before wrapping. The log file may be automatically cleared at the start of a test run cycle, and/or the log file may be cleared by a user command. A network administrator may view the contents of the log file to assess the results of test runs. The whole log file may be displayed, or the network administrator may enter a numerical parameter representing the lines to be shown.

SCOPE OF THE INVENTION

The above description presents the best mode contemplated for carrying out the present system and methods for testing fabrics and for configuring switch elements into test tools, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method executing on a hardware computing system for configuring a switch element having a plurality of ports to operate as a test tool, the switch element being connected to a network, the method comprising the steps of:
    initiating a user interface with a plurality of selectable options, where a user selects one or more of the selectable options for configuring test parameters for a selected one of the ports to operate as a test port;
    obtaining a license key for configuring the selected port to operate as the test port;
    selecting a frame type for transmitting frames from the test port;
    specifying characteristics for the frames transmitted by the test port;
    determining whether the test port is online or offline;
    enabling a transmitter of the test port;
    starting a link state machine of the test port;
    the test port receiving an active signal or an active primitive to thereby activate the test port;
    the test port logging into the network; and
    the test port logging into a target device of the network.

2. The method of claim 1, wherein the step of logging the test port into the network comprises sending a fabric login primitive (FLOGI) to the test port.

3. The method of claim 2, wherein the step of logging the test port into the network further comprises verifying that the FLOGI was sent properly.

4. The method of claim 3, wherein the step of logging the test port into the network further comprises receiving acknowledgement that the test port received the FLOGI.

5. The method of claim 1, wherein the step of logging the test port into the target device comprises sending a port login primitive (PLOGI) to the target device.

6. The method of claim 5, wherein the step of logging the test port into the target device further comprises verifying that the PLOGI was sent properly.

7. The method of claim 6, wherein the step of logging the test port into the target device further comprises receiving acknowledgement that the target device received the PLOGI.

8. The method of claim 1, further comprising the step of generating traffic between the test port and a target device.

9. The method of claim 8, wherein the traffic comprises data frames.

10. The method of claim 8, further comprising the step of the test port creating a log file having information regarding the traffic.

11. The method of claim 1, further comprising the step of the test port obtaining addresses of a plurality of target devices from a fabric nameserver via a Fibre Channel Layer 4 (FC-4) device type query.

12. The method of claim 11, further comprising the steps of generating traffic from the test port to successive ones of the plurality of target devices, wherein traffic to each of the target devices continues for a preset interval after which the test port generates traffic to a next one of the plurality of target devices.

13. The method of claim 1, wherein the frame characteristics include at least one of frame data patterns, frame lengths, frame counts, whether the frames are to be repeated forever in hardware, whether the frames are to be generated in software, whether frames are to be sent from user defined files, and whether operationally acquired source identifier (S_ID) and destination identifier (D_ID) should replace user defined S_ID/D_ID within frame files.

14. The method of claim 1, wherein the active signal or active primitive is received from firmware of the switch element.

15. The method of claim 1, further comprising the step of determining whether the target device has been configured.

16. A system for testing storage area network device configuration, comprising:
    a plurality of ports coupled to a switch element with a plurality of switch ports; and
    a computing system executing a user interface, the user interface providing a plurality of selectable options to a user to configure one or more of the switch ports to operate as a test port; wherein the user (a) selects one or more of the selectable options for configuring test parameters for a selected one of the switch ports to operate as a test port; (b) obtains a license key for configuring the selected port to operate as the test port; (c) selects a frame type for transmitting frames from the test port; (d) specifies characteristics for the frames transmitted by the test port; (e) enables a transmitter of the test port; (f) starts a link state machine of the test port; and (g) the test port logs into a target device of a network.

17. The system of claim 16, wherein the switch element is a Fibre Channel switch element and based on a user selection, Fibre Channel traffic is generated between the test port and the target device.

18. The system of claim 17, wherein the frame characteristics include at least one of frame data patterns, frame lengths, frame counts, whether the frames are to be repeated forever in hardware, whether the frames are to be generated in software, whether frames are to be sent from user defined files, and whether operationally acquired source identifier (S_ID) and destination identifier (D_ID) should replace user defined S_ID/D_ID within frame files.

19. The system of claim 17, wherein the test port creates a log file having information regarding the traffic generated between the test port and the target device.

20. The system of claim 16, wherein the switch element is a non-Fibre Channel switch element and based on a user selection, network traffic is generated between the test port and the target device.

* * * * *